(12) United States Patent
Cavaliere et al.

(10) Patent No.: US 8,817,589 B2
(45) Date of Patent: Aug. 26, 2014

(54) COMMUNICATIONS NETWORK APPARATUS AND LINE CODING METHOD

(75) Inventors: Fabio Cavaliere, Pisa (IT); Stefan Dahlfort, Santa Clara, CA (US); Luca Giorgi, Pisa (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 201 days.

(21) Appl. No.: 13/235,227

(22) Filed: Sep. 16, 2011

(65) Prior Publication Data

US 2013/0071118 A1    Mar. 21, 2013

(51) Int. Cl.
- H04J 9/00 (2006.01)
- H04J 14/00 (2006.01)
- H04B 10/20 (2006.01)
- H04B 10/00 (2013.01)
- H04L 25/49 (2006.01)

(52) U.S. Cl.
CPC .................. H04L 25/4902 (2013.01)
USPC .............. 370/205; 398/87; 398/98; 398/140; 398/183; 398/43; 398/25; 398/58; 398/59; 398/60; 398/61; 398/62; 398/63; 398/64; 398/65; 398/66; 398/67; 398/68; 398/69; 398/70; 398/71; 398/72

(58) Field of Classification Search
USPC ................. 398/63, 67, 79, 58, 344, 188, 105; 370/201–211
See application file for complete search history.

(56) References Cited

U.S. PATENT DOCUMENTS

| | | | |
|---|---|---|---|
| 7,630,638 B2* | 12/2009 | Brolin ............................. | 398/68 |
| 8,041,216 B2* | 10/2011 | de Lind van Wijngaarden ................... | 398/71 |
| 8,320,764 B2* | 11/2012 | Charlet et al. ................. | 398/105 |
| 2006/0140641 A1* | 6/2006 | Brolin ........................... | 398/183 |
| 2006/0140642 A1* | 6/2006 | Brolin ........................... | 398/183 |
| 2008/0002977 A1* | 1/2008 | Mori ................................ | 398/71 |
| 2008/0232807 A1* | 9/2008 | Lee et al. ........................ | 398/87 |
| 2009/0116848 A1* | 5/2009 | Kim et al. ...................... | 398/140 |
| 2010/0316387 A1* | 12/2010 | Suvakovic ..................... | 398/98 |
| 2011/0170865 A1* | 7/2011 | Zheng ............................. | 398/43 |
| 2011/0236021 A1* | 9/2011 | Presi et al. ..................... | 398/67 |
| 2012/0134669 A1* | 5/2012 | Xu et al. ......................... | 398/38 |

FOREIGN PATENT DOCUMENTS

| | | |
|---|---|---|
| WO | 2007108592 A1 | 9/2007 |
| WO | 2010025767 A1 | 3/2010 |

OTHER PUBLICATIONS

International Search Report and Written Opinion, Application No. PCT/EP2012/056075, dated Jul. 4, 2012, 14 pages.

Marco Presi et al, "An 80km reach fully passive WDM-PON based on reflective ONUs," Nov. 10, 2008, 6 pages, Optics Express, vol. 16, No. 23.

* cited by examiner

*Primary Examiner* — Asad Nawaz
*Assistant Examiner* — Berhanu Belete
(74) *Attorney, Agent, or Firm* — Blakely Sokoloff Taylor & Zafman LLP

(57) ABSTRACT

Methods and apparatus for line coding in a communications network are described. According to one embodiment of the invention, downstream communications traffic bits are received and mapped into downstream bit positions of a transmission structure. A pre-selected bit in each upstream bit positions of the transmission structure is provided to form a downstream transmission structure. A downstream optical signal carrying the downstream transmission structure is generated for transmission. Upstream communications traffic bits are also received and mapped into the upstream bit positions of the transmission structure to form an upstream transmission structure. An upstream optical signal carrying the upstream transmission structure is generated for transmission.

20 Claims, 9 Drawing Sheets

US 8,817,589 B2

COMMUNICATIONS NETWORK APPARATUS AND LINE CODING METHOD

TECHNICAL FIELD

The invention relates to a communications network line coding method. The invention further relates to a communications network line terminal. The invention further relates to a communications network unit. The invention further relates to a communications network.

BACKGROUND

The use of signal remodulation techniques in wavelength division multiplexed passive optical networks, WDM PON, can provide significant advantages in terms of aggregate transmission capacity and cost. A WDM PON using an inverse return-to-zero, IRZ, modulation format in downstream and a return-to-zero, RZ, modulation format in upstream has been reported in M. Presi et al, "A 80 km reach fully passive WDM-PON based on reflective ONUs", Optics Express, 10 Nov. 2008, page 19043. This WDM-PON provides a trade-off between cost and performance; low cost optics are used (a reflective semi-conductor optical amplifier, RSOA, at the optical network terminal and direct modulated lasers at the optical line terminal) and good resilience to propagation impairments such as optical reflections and noise is achieved. The WDM-PON reported by M. Presi et al operates at symmetric downstream and upstream bit rates. Some WDM-PONs, such as fibre to the home, FTTH, gigabit PON networks typically operate with asymmetric traffic bit rates, with the downstream rate higher than the upstream rate. For example, a downstream channel used for both data download and video multicast and an upstream channel used just for data upload.

SUMMARY

It is an object to provide an improved communications network line coding method. It is a further object to provide an improved communications network line terminal. It is a further object to provide an improved communications network unit. It is a further object to provide an improved communications network.

A first aspect of the invention provides a communications network line coding method. The method comprises receiving a first plurality of downstream communications traffic bits. The method further comprises mapping the downstream communications traffic bits into a said first plurality of downstream bit positions of a transmission structure and providing a pre-selected bit in each of a second plurality of upstream bit positions of the transmission structure to form a downstream transmission structure. The method further comprises generating and transmitting a downstream optical signal carrying the downstream transmission structure. The method further comprises receiving a said second plurality of upstream communications traffic bits. The method further comprises mapping the upstream communications traffic bits into the upstream bit positions of a said transmission structure to form an upstream transmission structure. The method further comprises generating and transmitting an upstream optical signal carrying the upstream transmission structure.

The line coding method may support both symmetric and asymmetric downstream and upstream transmission bit rates. The method may therefore enable higher downstream transmission bit rates to be achieved without requiring an increase in the upstream transmission bit rate. The method may ensure that in the upstream direction traffic is only transmitted in the upstream bit positions.

In an embodiment, the upstream bit positions are provided consecutively within the transmission structure. This may minimise the time and processing bandwidth required to identify each upstream bit position and provide the pre-selected bit in each upstream bit position.

In an embodiment, the upstream bit positions are provided after the downstream bit positions within the transmission structure. This may minimise the time and processing bandwidth required to identify each upstream bit position and provide the pre-selected bit in each upstream bit position.

In an embodiment, the upstream bit positions are provided non-consecutively within the transmission structure.

In an embodiment, each pre-selected bit is represented by a higher amplitude in the downstream signal. This may enable the method to be used with a WDM-PON based on wavelength re-use. In an embodiment, each pre-selected bit is a logical "1".

In an embodiment, the upstream bit positions are provided at the same location in each transmission structure. This may minimise the time and processing bandwidth required to identify each upstream bit position and provide the pre-selected bit in each upstream bit position.

In an embodiment, there are a greater number of downstream bit positions in the transmission structure than upstream bit positions. The line coding method may enable a downstream transmission bit rate to be used which is higher than the upstream transmission bit rate. The method may therefore provide a cost effective way to increase the downstream transmission bit rate without changing the upstream transmission bit rate of a communications network.

In an embodiment, each downstream communications traffic bit has a first bit period. Each downstream bit position and each upstream bit position has a second bit period which is less than the first bit period. The total of the second bit periods of the downstream bit positions and the upstream bit positions is equal to the total of the first bit periods of the communications traffic bits. The method may therefore be implemented without requiring any change to the downstream bit rate.

In an embodiment, the downstream communications traffic bits have a downstream bit rate, R bits/second, and a bandwidth of approximately R Hz. Each downstream transmission structure has a said downstream bit rate, R, and a downstream bandwidth which is approximately $R(N+k)/N$, where N is said first plurality and k is said second plurality. Each upstream transmission structure has an upstream bit $R/N$ and an upstream bandwidth which is approximately $R(N+k)/(Nk)$.

In an embodiment, the communications network comprises a wavelength division multiplexed passive optical network. The downstream optical signal and the upstream optical signal are generated and transmitted at the same wavelength. The upstream optical signal is generated by receiving a portion of the downstream optical signal and remodulating the said portion to form the upstream optical signal. The method may ensure that in the upstream direction traffic is only transmitted in the upstream bit positions. This may ensure that upstream pulses are not cancelled during the process of generating the upstream optical signal. The method may enable the downstream transmission bit rate of a WDM-PON based on wavelength re-use to be increased without requiring the bandwidth to be multiplied.

In an embodiment, the downstream optical signal has an inverse-return-to-zero modulation format and the upstream optical signal has a return-to-zero modulation format. The method may enable the IRZ/RZ line coding pair reported by M. Presi et al to be used on asymmetric communications network links where the upstream transmission bit rate is lower than the downstream transmission bit rate.

In an embodiment, the transmission structure is a codeword. The method may therefore be used with known codewords.

A second aspect of the invention provides a non-transitory computer readable medium having executable computer program instructions embodied therein, the instructions being for providing access to resources available on a processor and the instructions, if executed by a processor, will cause the processor to perform any of the steps of the communications network line coding method as described above.

A third aspect of the invention provides a communications network line terminal comprising mapping apparatus, a downstream transmitter and an upstream receiver. The mapping apparatus is arranged to receive a first plurality of downstream communications traffic bits. The mapping apparatus is arranged to map the downstream communications traffic bits into a said first plurality of downstream bit positions of a transmission structure and to provide a pre-selected bit in each of a second plurality of upstream bit positions of the transmission structure to form a downstream transmission structure. The downstream transmitter is arranged to generate and transmit a downstream communications signal carrying the downstream transmission structure. The upstream receiver is arranged to receive an upstream communications signal.

The communications network line terminal may support both symmetric and asymmetric downstream and upstream transmission bit rates. The communications network line terminal may therefore enable higher downstream transmission bit rates to be achieved without requiring an increase in the upstream transmission bit rate.

In an embodiment, the upstream bit positions are provided consecutively within the transmission structure. This may minimise the time and processing bandwidth required to identify each upstream bit position and provide the pre-selected bit in each upstream bit position.

In an embodiment, the upstream bit positions are provided after the downstream bit positions within the transmission structure. This may minimise the time and processing bandwidth required to identify each upstream bit position and provide the pre-selected bit in each upstream bit position.

In an embodiment, the upstream bit positions are provided non-consecutively within the transmission structure.

In an embodiment, each pre-selected bit is represented by a higher amplitude in the downstream signal. This may enable the communications network line terminal to be used within a WDM-PON based on wavelength re-use. In an embodiment, each pre-selected bit is a logical "1".

In an embodiment, the upstream bit positions are provided at the same location in each transmission structure. This may minimise the time and processing bandwidth required to identify each upstream bit position and provide the pre-selected bit in each upstream bit position.

In an embodiment, there are a greater number of downstream bit positions in the transmission structure than upstream bit positions. This may enable a downstream transmission bit rate to be used which is higher than the upstream transmission bit rate. The communications network line terminal may therefore enable the downstream transmission bit rate to be increased without changing the upstream transmission bit rate.

In an embodiment, each downstream communications traffic bit has a first bit period. Each downstream bit position and each upstream bit position has a second bit period which is less than the first bit period. The total of the second bit periods of the downstream bit positions and the upstream bit positions is equal to the total of the first bit periods of the communications traffic bits. The communications network line terminal may be used in a communications network without requiring any change to the downstream bit rate.

In an embodiment, the downstream communications traffic bits have a downstream bit rate, R bits/second, and a bandwidth of approximately R Hz. Each downstream transmission structure has a said downstream bit rate, R, and a downstream bandwidth which is approximately R(N+k)/N, where N is said first plurality and k is said second plurality. Each upstream transmission structure has an upstream bit R/N and an upstream bandwidth which is approximately R(N+k)/(Nk).

In an embodiment, the communications network line terminal is a passive optical network line terminal. The downstream transmitter is arranged to generate and transmit a downstream optical signal carrying the downstream transmission structure. The communications network line terminal may enable the downstream transmission bit rate of a WDM-PON based on wavelength re-use to be increased without requiring the bandwidth to be multiplied.

In an embodiment, the downstream optical signal has an inverse-return-to-zero modulation format. The communications network line terminal may enable the IRZ/RZ line coding pair reported by M. Presi et al to be used on asymmetric communications network links where the upstream transmission bit rate is lower than the downstream transmission bit rate.

In an embodiment, the transmission structure is a codeword.

A fourth aspect of the invention provides a communications network unit comprising mapping apparatus, an upstream transmitter and a downstream receiver. The mapping apparatus is arranged to receive a second plurality of upstream communications traffic bits. The mapping apparatus is arranged to map the upstream communications traffic bits into a said second plurality of upstream bit positions of a transmission structure to form an upstream transmission structure. The transmission structure additionally has a first plurality of downstream bit positions. The upstream transmitter is arranged to generate and transmit an upstream communications signal carrying the upstream transmission structure. The downstream receiver is arranged to receive a downstream communications signal.

The communications network unit may support both symmetric and asymmetric downstream and upstream transmission bit rates. The communications network unit may therefore enable higher downstream transmission bit rates to be achieved without requiring an increase in the upstream transmission bit rate. The communications network unit may ensure that in the upstream direction traffic is only transmitted in the upstream bit positions.

In an embodiment, the upstream bit positions are provided consecutively within the transmission structure. This may minimise the time and processing bandwidth required to identify each upstream bit position and to map an upstream traffic bit into it.

In an embodiment, the upstream bit positions are provided after the downstream bit positions within the transmission structure. This may minimise the time and processing bandwidth required to identify each upstream bit position and to map an upstream traffic bit into it.

In an embodiment, the upstream bit positions are provided non-consecutively within the transmission structure.

In an embodiment, each pre-selected bit is represented by a higher amplitude in the downstream signal. This may enable the communications network unit to be based on wavelength re-use. In an embodiment, each pre-selected bit is a logical "1".

In an embodiment, the upstream bit positions are provided at the same location in each transmission structure. This may minimise the time and processing bandwidth required to identify each upstream bit position and to map an upstream traffic bit into it.

In an embodiment, there are a greater number of downstream bit positions in the transmission structure than upstream bit positions. This may enable the communications network unit to be used with a downstream transmission bit rate which is higher than the upstream transmission bit rate. This may provide a cost effective way to increase a downstream transmission bit rate without changing the upstream transmission bit rate of a communications network.

In an embodiment, each downstream communications traffic bit has a first bit period. Each downstream bit position and each upstream bit position has a second bit period which is less than the first bit period. The total of the second bit periods of the downstream bit positions and the upstream bit positions is equal to the total of the first bit periods of the communications traffic bits.

In an embodiment, the downstream communications traffic bits have a downstream bit rate, R bits/second, and a bandwidth of approximately R Hz. Each downstream transmission structure has a said downstream bit rate, R, and a downstream bandwidth which is approximately $R(N+k)/N$, where N is said first plurality and k is said second plurality. Each upstream transmission structure has an upstream bit R/N and an upstream bandwidth which is approximately $R(N+k)/(Nk)$.

In an embodiment, the communications network unit is a passive optical network unit. The downstream receiver is arranged to receive a downstream optical signal. The upstream transmitter is arranged to receive a portion of downstream optical signal and is arranged to remodulate the said portion to form an upstream optical signal having a return-to-zero modulation format. The communications network unit may ensure that in the upstream direction traffic is only transmitted in the upstream bit positions. This may ensure that upstream pulses are not cancelled during the process of generating the upstream optical signal.

In an embodiment, the transmission structure is a codeword.

A fifth aspect of the invention provides a communications network comprising a communications network line terminal, a communications network unit and a communications link. The communications network line terminal comprises mapping apparatus, a downstream transmitter and an upstream receiver. The mapping apparatus is arranged to receive a first plurality of downstream communications traffic bits. The mapping apparatus is arranged to map the downstream communications traffic bits into a said first plurality of downstream bit positions of a transmission structure and to provide a pre-selected bit in each of a second plurality of upstream bit positions of the transmission structure to form a downstream transmission structure. The downstream transmitter is arranged to generate and transmit a downstream communications signal carrying the downstream transmission structure. The upstream receiver is arranged to receive an upstream communications signal. The communications network unit mapping apparatus, an upstream transmitter and a downstream receiver. The mapping apparatus is arranged to receive a second plurality of upstream communications traffic bits. The mapping apparatus is arranged to map the upstream communications traffic bits into a said second plurality of upstream bit positions of a transmission structure to form an upstream transmission structure. The transmission structure additionally has a first plurality of downstream bit positions. The upstream transmitter is arranged to generate and transmit an upstream communications signal carrying the upstream transmission structure. The downstream receiver is arranged to receive a downstream communications signal. The communications link is coupled between the communications network line terminal and the communications network unit and is configured to transmit downstream and upstream data signals therebetween.

The network may support both symmetric and asymmetric downstream and upstream transmission bit rates. The network may therefore enable higher downstream transmission bit rates to be achieved without requiring an increase in the upstream transmission bit rate. The network may ensure that in the upstream direction traffic is only transmitted in the upstream bit positions.

In an embodiment, the upstream bit positions are provided consecutively within the transmission structure. This may minimise the time and processing bandwidth required to identify each upstream bit position and to provide the pre-selected bit in each upstream bit position or to map an upstream traffic bit into each upstream bit position.

In an embodiment, the upstream bit positions are provided after the downstream bit positions within the transmission structure. This may minimise the time and processing bandwidth required to identify each upstream bit position and to provide the pre-selected bit in each upstream bit position or to map an upstream traffic bit into each upstream bit position.

In an embodiment, the upstream bit positions are provided non-consecutively within the transmission structure.

In an embodiment, each pre-selected bit is represented by a higher amplitude in the downstream signal. The communications network may use wavelength re-use in the upstream direction. In an embodiment, each pre-selected bit is a logical "1".

In an embodiment, the upstream bit positions are provided at the same location in each transmission structure. This may minimise the time and processing bandwidth required to identify each upstream bit position and to provide the pre-selected bit in each upstream bit position or to map an upstream traffic bit into each upstream bit position.

In an embodiment, there are a greater number of downstream bit positions in the transmission structure than upstream bit positions. The network may enable a downstream transmission bit rate to be used which is higher than the upstream transmission bit rate. The network may therefore provide a cost effective way of increasing the downstream transmission bit rate without changing the upstream transmission bit rate.

In an embodiment, each downstream communications traffic bit has a first bit period. Each downstream bit position and each upstream bit position has a second bit period which is less than the first bit period. The total of the second bit periods of the downstream bit positions and the upstream bit positions is equal to the total of the first bit periods of the communications traffic bits.

In an embodiment, the downstream communications traffic bits have a downstream bit rate, R bits/second, and a bandwidth of approximately R Hz. Each downstream transmission structure has a said downstream bit rate, R, and a downstream bandwidth which is approximately $R(N+k)/N$, where N is said first plurality and k is said second plurality. Each upstream transmission structure has an upstream bit R/N and an upstream bandwidth which is approximately R(N+k)/(Nk).

In an embodiment the communications network line terminal is a passive optical network line terminal and the communications network unit is a passive optical network unit. The downstream transmitter of the network line terminal is arranged to generate and transmit a downstream optical signal carrying the downstream transmission structure. The downstream optical signal has an inverse-return-to-zero modulation format. The downstream receiver of the network unit is arranged to receive a downstream optical signal. The upstream transmitter of the network unit is arranged to receive a portion of downstream optical signal and the upstream transmitter is arranged to remodulate the said portion to form an upstream optical signal, the upstream optical signal having a return-to-zero modulation format. The network may ensure that in the upstream direction traffic is only transmitted in the upstream bit positions. This may ensure that upstream pulses are not cancelled during the process of generating the upstream optical signal. The network may enable the downstream transmission bit rate of a WDM-PON based on wavelength re-use to be increased without requiring the bandwidth to be multiplied.

In an embodiment, the transmission structure is a codeword.

Embodiments of the invention will now be described, by way of example only, with reference to the accompanying drawings.

DETAILED DESCRIPTION

Figure 1:
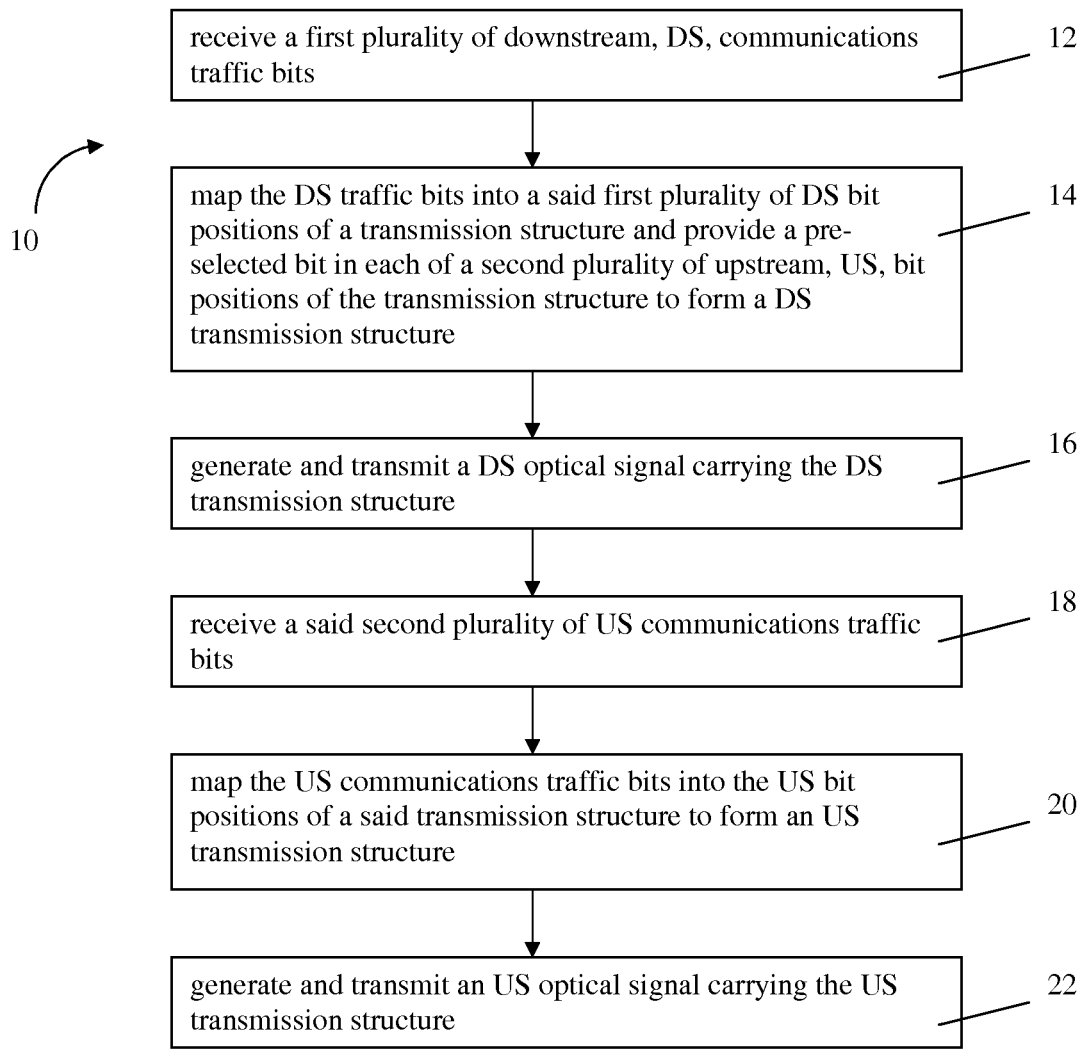
FIG. 1 shows the steps of a communications network line coding method according to a first embodiment of the invention.
Figure 2:
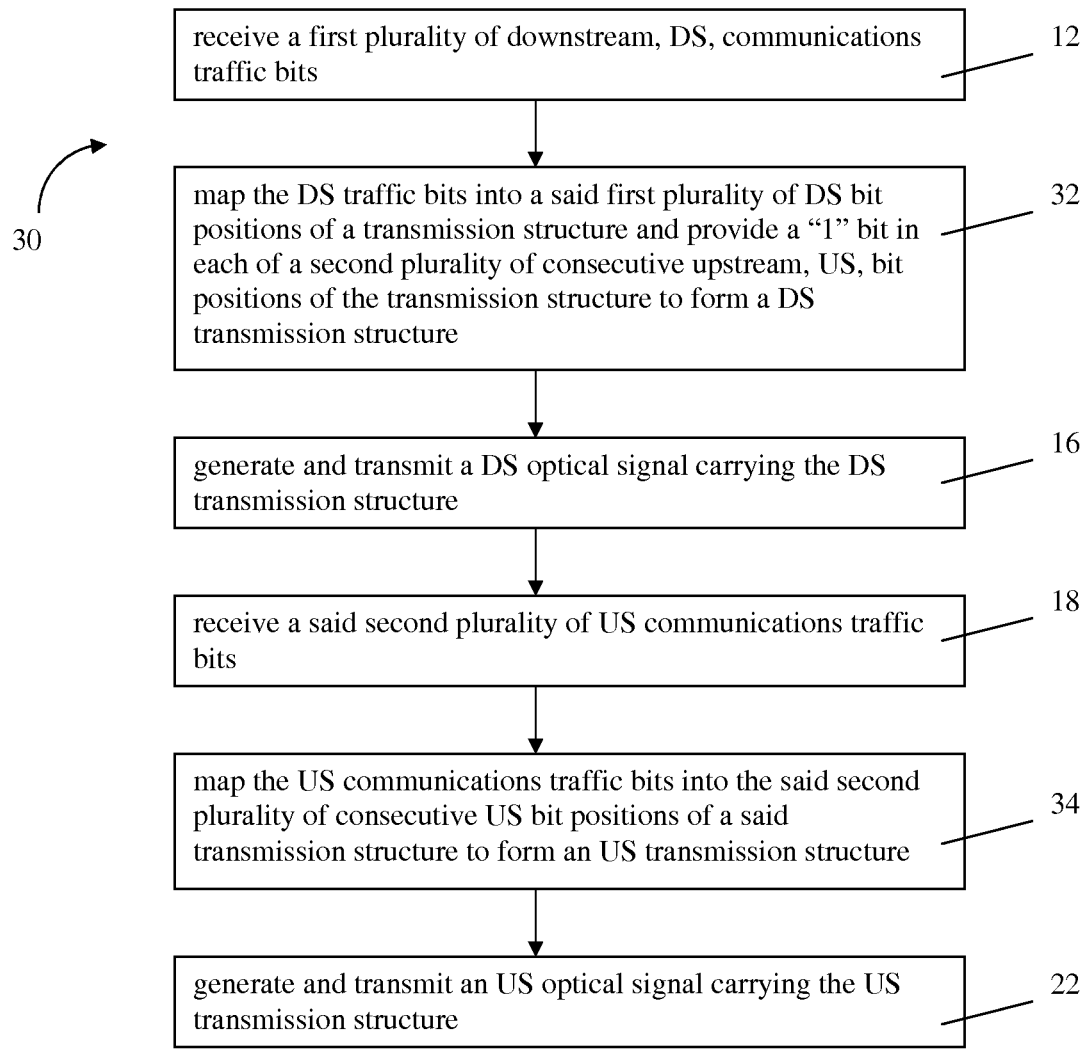
FIG. 2 shows the steps of a communications network line coding method according to a second embodiment of the invention.
Figure 3:
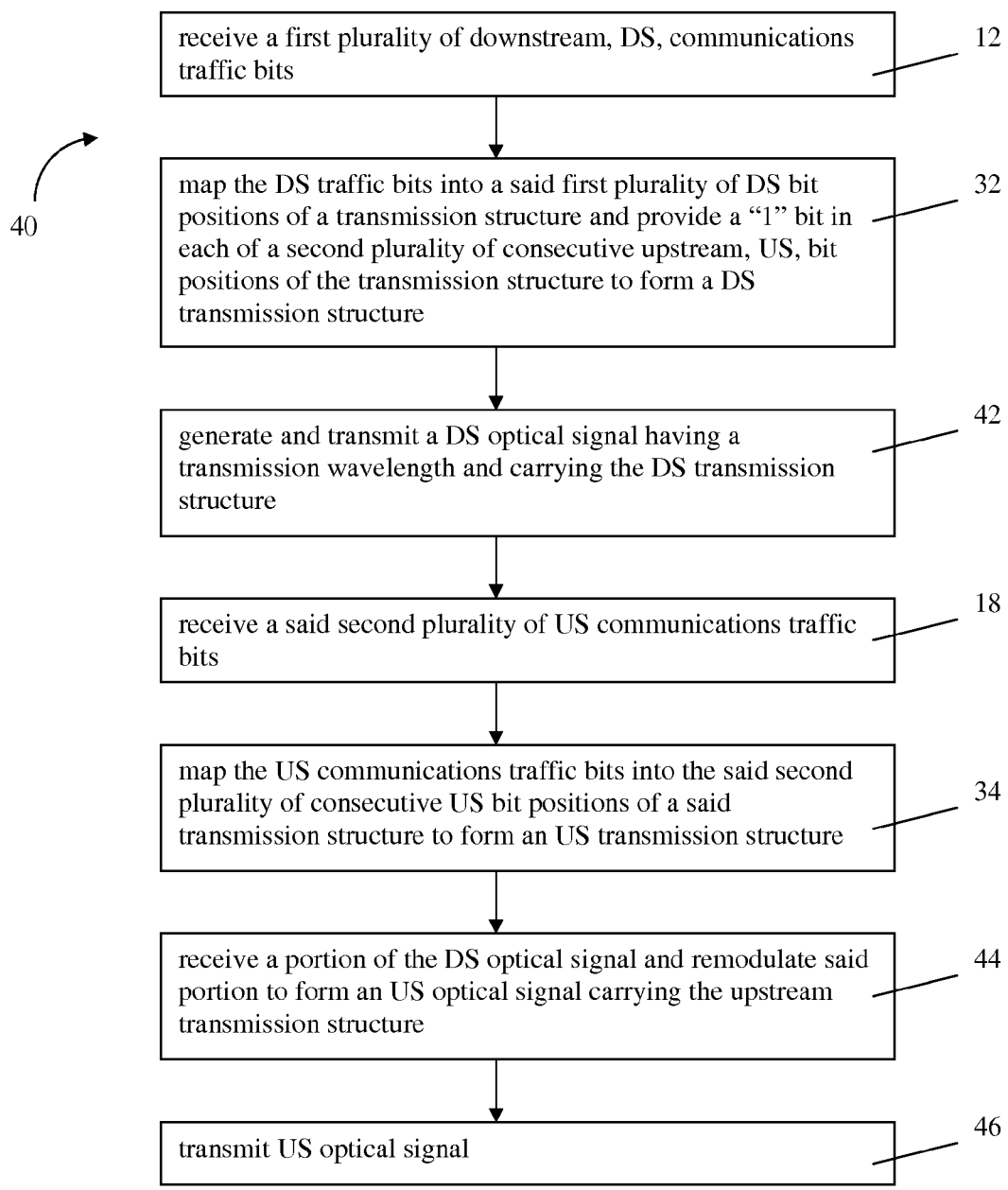
FIG. 3 shows the steps of a communications network line coding method according to a third embodiment of the invention.

A first embodiment of the invention provides a communications network line coding method 10.

The method 10 comprises receiving a first plurality of downstream, DS, communications traffic bits 12. The downstream communications traffic bits are mapped into a said first plurality of downstream bit positions of a transmission structure and a pre-selected bit is provided in each of a second plurality of upstream, US, bit positions of the transmission structure 14. A downstream transmission structure is thereby formed 14. A downstream optical signal carrying the downstream transmission structure is then generated and transmitted 16.

The method 10 comprises receiving a said second plurality of upstream communications traffic bits 18. The upstream communications traffic bits are mapped into the upstream bit positions of a said transmission structure to form an upstream transmission structure 20. An upstream optical signal carrying the upstream transmission structure is then generated and transmitted 22.

A second embodiment of the invention provides a communications network line coding method 30. The method 30 of this embodiment is similar to the method 10 of the first embodiment, with the following modifications. The same reference numbers are retained for corresponding steps.

In this embodiment the US bit positions are provided consecutively within the transmission structure and each pre-selected bit is a logical "1". It will be appreciated that a logical "1" may be represented in an optical signal by a higher optical signal amplitude, for example in the case of an RZ modulated signal, or may be represented by a low amplitude optical signal amplitude, for example in the case of an IRZ modulated signal.

In the downstream, DS, direction, the DS traffic bits are mapped into the DS bit positions of a transmission structure and a "1" bit is provided in each of the US bit positions of the transmission structure to form a DS transmission structure 32. In the upstream, US, direction the US traffic bits are mapped into the US bit positions of a said transmission structure to form a US transmission structure 34.

A third embodiment of the invention provides a communications network line coding method 40. The method 40 of this embodiment is similar to the method 30 of the previous embodiment, with the following modifications. The same reference numbers are retained for corresponding steps.

In this embodiment the communications network comprises a wavelength division multiplexed passive optical network, WDM PON. The downstream optical signal is generated and transmitted at a transmission wavelength, carrying the downstream transmission structure 42.

The upstream optical signal is generated by receiving a portion of the downstream optical signal and remodulating the said portion to form the upstream optical signal carrying the upstream transmission structure 44. The upstream optical signal carrying the upstream transmission structure is then transmitted at the same wavelength as the downstream optical signal 46.

Figure 4:
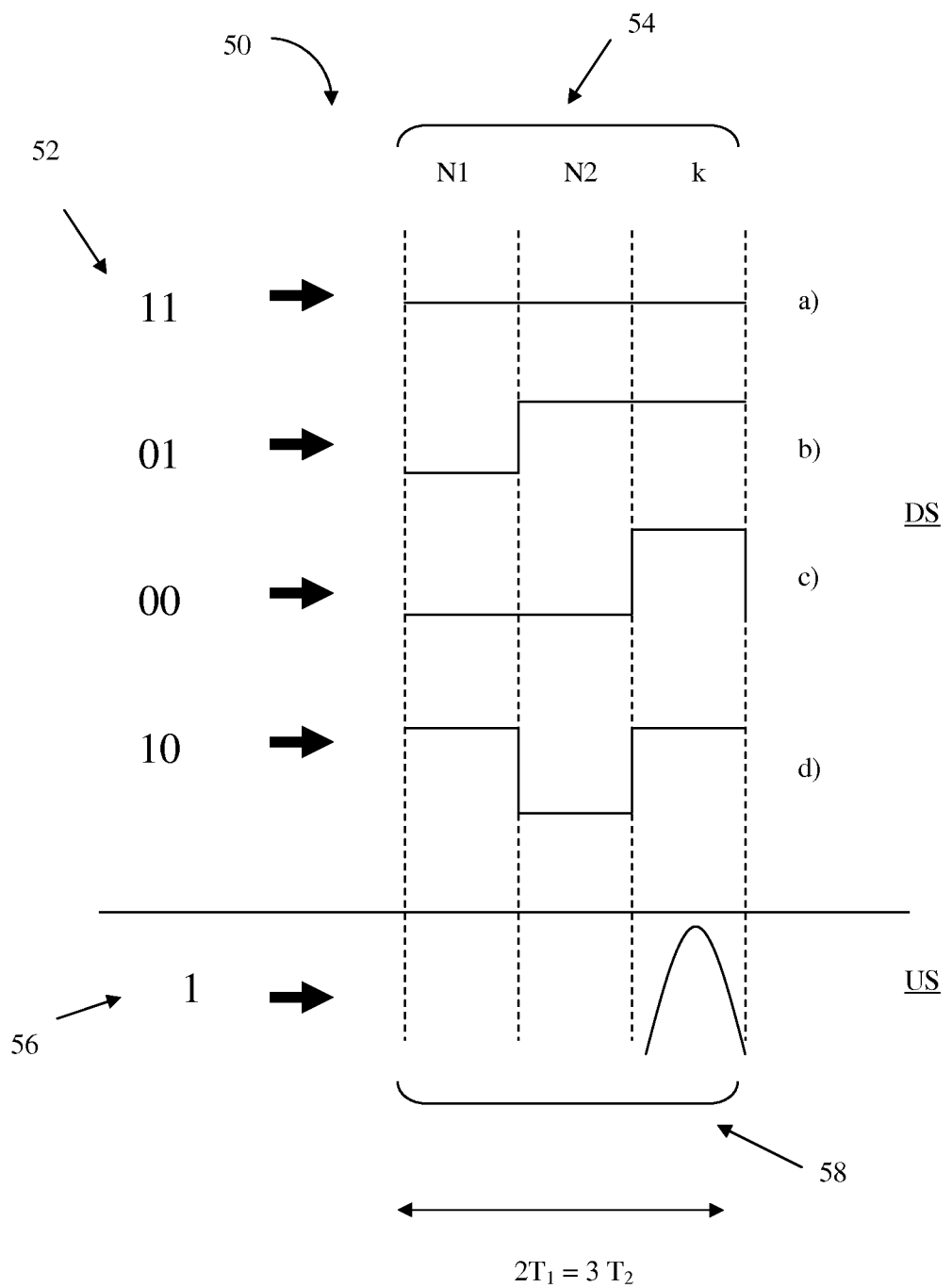
FIG. 4 illustrates downstream (DS) communications traffic bits, the corresponding RZ downstream signals, an upstream (US) communications traffic bit and a corresponding RZ upstream signal of a communications network line coding method according to a fourth embodiment of the invention.

A fourth embodiment of the invention provides a communications network line coding method the signals 50 of which are represented in FIG. 4. The method of this embodiment is similar to the method 40 of the previous embodiment, with the following modifications.

The method 50 comprises receiving a first plurality, N, of downstream, DS, communications traffic bits 52. The downstream communications traffic bits are mapped into a said first plurality of downstream bit positions of a transmission structure and a pre-selected bit is provided in each of a second plurality, k, of upstream, US, bit positions of the transmission structure 14.

In this embodiment the transmission structure 54 has two downstream bit positions, N1, N2, and one upstream bit position, k. The upstream bit position is located after the downstream bit positions. The upstream bit position is the same in each downstream transmission structure 54, for each of the downstream signals a to d, and in the upstream transmission structure 58.

In the signal examples shown in FIG. 4, in the downstream direction two downstream traffic bits 52 are received and are mapped into the transmission structure to form a downstream transmission structure 54. In the upstream direction a single upstream traffic bit 56 is mapped into the upstream bit of the transmission structure to form an upstream transmission structure 58.

In this example, the received downstream communications traffic bits 52 have a bit rate, R, of 2.5 Gbit/s and an approximate bandwidth, ~R, of 2.5 GHz. Following mapping into the transmission structure 54 the downstream communications traffic bits still have a bit rate of 2.5 Gbit/s. The bandwidth of the downstream signal is given by $$\sim R(N+k)/N$$

which in this example is 3.75 GHz. The upstream communications traffic bit 56 has a bit rate given by R/N, which in this example is 1.25 Gbit/s, and the upstream signal has a bandwidth given by $$\sim R(N+k)/(Nk)$$

which in this example is 3.75 GHz.

Each downstream communications traffic bit has a first bit period, T1, which in this example is 400 ps. Each downstream bit position and each upstream bit position of the transmission structure 54 has a second bit period, T2. The total, 3T2, of the bit periods of the downstream bit positions and the upstream bit positions must be equal to the total, 2T1, of the first bit periods of the communications traffic bits. The second bit period is therefore less than the first bit period, in this example 2T1/3=800/3=266 ps. The downstream traffic bits mapped into the transmission structure 54 and the "1" in the upstream bit position therefore each have a shorter bit period than the downstream communications traffic bits 52. In the upstream direction the upstream bit mapped into the transmission structure 56 similarly has a bit period of 266 ps.

Considering a symmetric transmission arrangement, for example where N=1 and k=1, a received downstream communications traffic bits 52 having a bit rate, R, of 1.25 Gbit/s and an approximate bandwidth, ~R, of 1.25 GHz would result in a downstream signal having a downstream bit rate, R, of 1.25 Gbit/s and a bandwidth, ~R(N+k)/N, of 2.5 GHz, and an upstream signal having a bit rate, R/N, of 1.25 Gbit/s and a bandwidth, ~R(N+k)/(Nk), of 2.5 GHz.

Comparing this with the above example of asymmetric transmission, where N=2 and k=1, it is apparent that the method of this embodiment enables asymmetric transmission to be achieved in which the downstream bit rate can be doubled without requiring a doubling of the upstream bit rate and without causing an doubling in the downstream and upstream bandwidths (which increase only by 50%).

Figure 5:
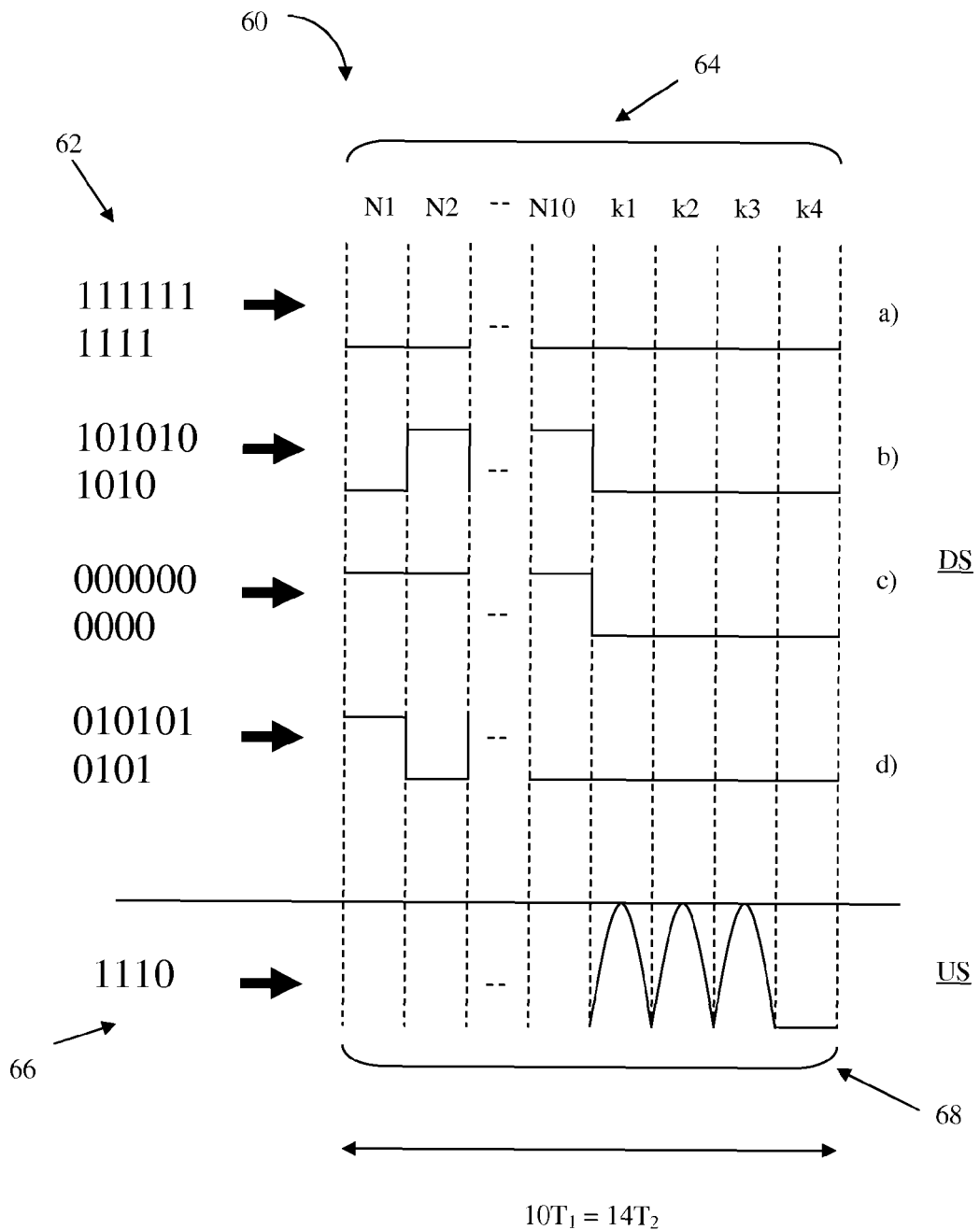
FIG. 5 illustrates downstream (DS) communications traffic bits, the corresponding IRZ downstream signals, an upstream (US) communications traffic bit and a corresponding RZ upstream signal of a communications network line coding method according to a fifth embodiment of the invention.

A fifth embodiment of the invention provides a communications network line coding method the signals 60 of which are represented in FIG. 5. The method of this embodiment is similar to the method of the fourth embodiment, with the following modifications.

In this embodiment the transmission structure 64 has ten downstream bit positions, N1 to N10, and four upstream bit positions, k1 to k4. The upstream bit positions are located after the downstream bit positions. The upstream bit positions are the same in each downstream transmission structure 64, for each of the downstream signals a to d, and in the upstream transmission structure 68.

In the signal examples shown in FIG. 5, in the downstream direction ten downstream traffic bits 62 are received and are mapped into the transmission structure to form a downstream transmission structure 64. In the upstream direction four upstream traffic bits 66 are mapped into the upstream bit positions of the transmission structure to form an upstream transmission structure 68.

The received downstream communications traffic bits 62 have a bit rate, R, of 10 Gbit/s and an approximate bandwidth, ~R, of 10 GHz. Following mapping into the transmission structure 64 the downstream communications traffic bits still have a bit rate of 10 Gbit/s. The bandwidth of the downstream signal, ~R(N+k)/N, is 14 GHz. The upstream communications traffic bits 66 have a bit rate, R/N, of 1 Gbit/s, and the upstream signal has a bandwidth, ~R(N+k)/(Nk), of 3.5 GHz.

The downstream bit rate can therefore be increased to be ten times the upstream bit rate without requiring any increase in the upstream bit rate.

In this embodiment the downstream optical signal has an inverse-return-to-zero, IRZ, modulation format and the upstream optical signal has a return-to-zero, RZ, modulation format.

Figure 6:
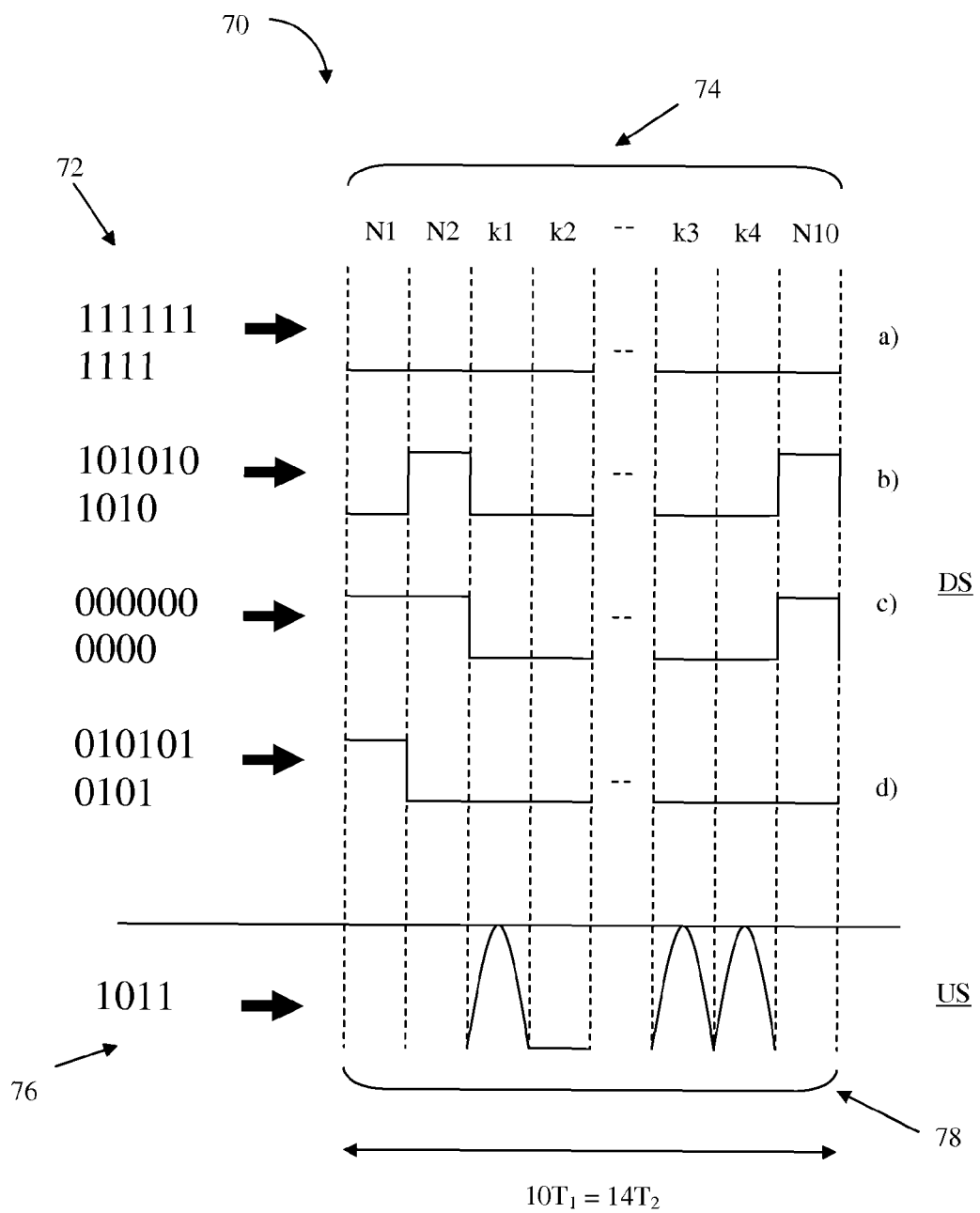
FIG. 6 illustrates downstream (DS) communications traffic bits, the corresponding IRZ downstream signals, an upstream (US) communications traffic bit and a corresponding upstream signal of a communications network line coding method according to a sixth embodiment of the invention.

A sixth embodiment of the invention provides a communications network line coding method the signals 70 of which are represented in FIG. 6. The method of this embodiment is similar to the method of the previous embodiment, with the following modifications.

In this embodiment the transmission structure 74 has ten downstream bit positions, N1 to N10, and four upstream bit positions, k1 to k4. The upstream bit positions are not continuously located in this example but are distributed among the downstream bit positions. The upstream bit positions are the same in each downstream transmission structure 74, for each of the downstream signals a to d, and in the upstream transmission structure 78.

In the signal examples shown in FIG. 6, in the downstream direction ten downstream traffic bits 72 are received and are mapped into the transmission structure to form a downstream transmission structure 74. In the upstream direction four upstream traffic bits 76 are mapped into the upstream bit positions of the transmission structure to form an upstream transmission structure 78.

Figure 7:
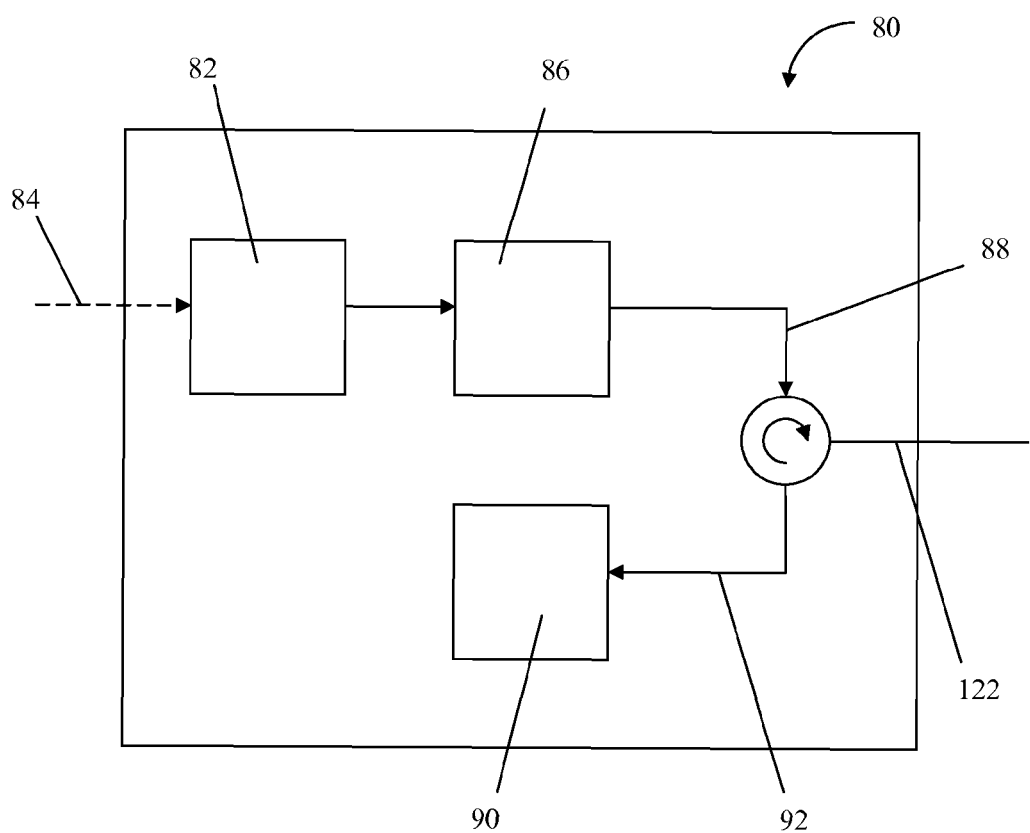
FIG. 7 is a schematic representation of a communications network line terminal according to a seventh embodiment of the invention.

A seventh embodiment of the invention provides a communications network line terminal 80 as shown in FIG. 7. The communications network line terminal 80 comprises mapping apparatus 82, a downstream transmitter 86 and an upstream receiver 90.

The mapping apparatus 82 is arranged to receive a first plurality of downstream communications traffic bits 84. The mapping apparatus 82 is arranged to map the downstream communications traffic bits into a said first plurality of downstream bit positions of a transmission structure and provide a pre-selected bit in each of a second plurality of upstream bit positions of the transmission structure to form a downstream transmission structure.

The downstream transmitter 86 is arranged to generate and transmit a downstream communications signal 88 carrying the downstream transmission structure. The upstream receiver 90 is arranged to receive an upstream communications signal 92.

In an eighth embodiment of the invention, also described with reference to FIG. 7, the communications network line terminal 80 is a passive optical network line terminal. The downstream transmitter 86 is arranged to generate and transmit a downstream optical signal carrying the downstream transmission structure. The downstream optical signal has an IRZ modulation format.

As reported by M. Presi et al (ibid), the IRZ modulation format comprises a two-level signal which comprises a light pulse (a continuous wave (CW) pulse) to represent a logical 0 and no pulse, i.e. no light, (also known as a "dark pulse") to represent a logical 1. The signal returns to zero (i.e. CW light) between pulses. The dark pulses have a 50% duty cycle, i.e. have a duration of one-half of a clock cycle. The dark pulses have a leading edge, being the transition from CW light to no light, and a trailing edge (the pulse "tail"), being the transition from no light to CW light.

The downstream transmitter 86 comprises an optical carrier signal source, in the form of a laser, operable to generate an optical carrier signal, an IRZ electronic data signal source and an intensity modulator, which here takes the form of a Mach-Zehnder modulator. The IRZ data signal source generates a 50% duty cycle IRZ data signal (50% IRZ) at 1.25 Gb/s. The 50% IRZ data signal drives the Mach-Zehnder modulator to apply the IRZ communications traffic bits to the optical carrier signal, to generate a 1.25 Gb/s 50% IRZ modulated downstream signal.

The downstream signal is coupled into an optical link 122 via an optical circulator. Upstream signals 92 are coupled from the optical link 122 to the upstream receiver 90 via the optical circulator.

Figure 8:
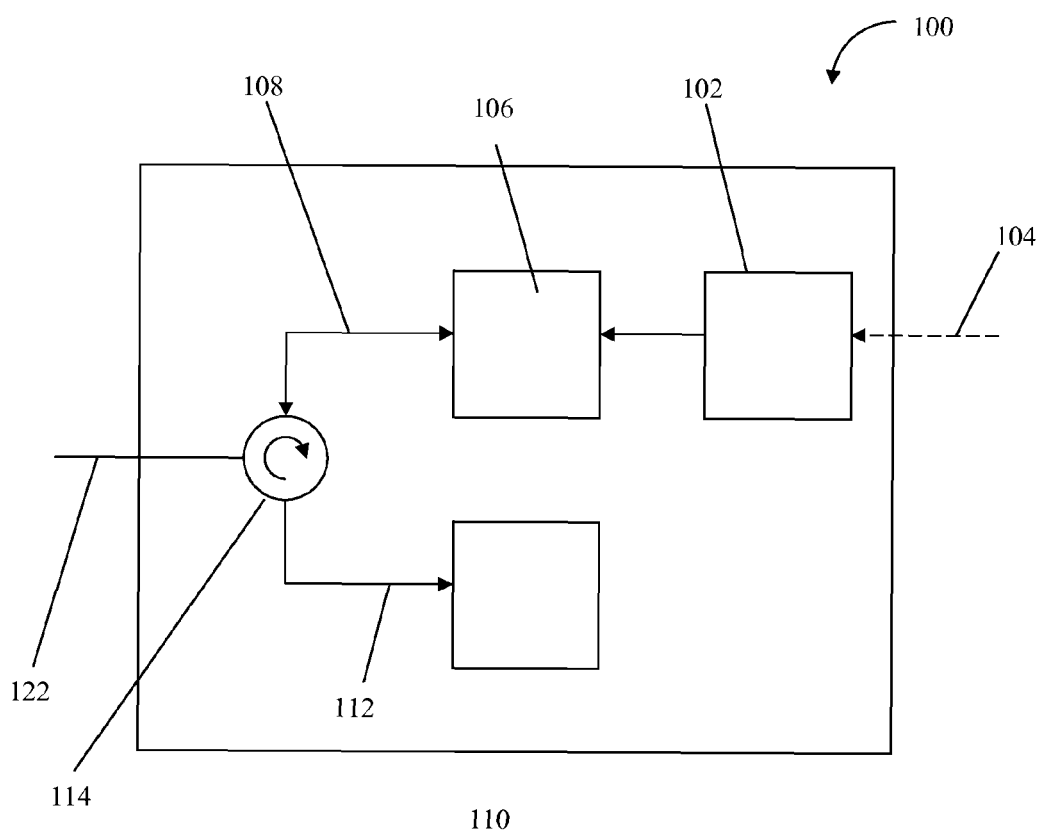
FIG. 8 is a schematic representation of a communications network unit according to a ninth embodiment of the invention.

A ninth embodiment of the invention provides a communications network unit 100 as shown in FIG. 8. The communications network unit 100 comprises mapping apparatus 102, an upstream transmitter 106 and a downstream receiver 110.

The mapping apparatus 102 is arranged to receive a second plurality of upstream communications traffic bits 104. The mapping apparatus 102 is arranged to map the upstream communications traffic bits into a said second plurality of upstream bit positions of a transmission structure to form an upstream transmission structure. The transmission structure additionally has a first plurality of downstream bit positions.

The upstream transmitter 106 is arranged to generate and transmit an upstream communications signal 108 carrying the upstream transmission structure. The downstream receiver 110 is arranged to receive a downstream communications signal 112.

In a tenth embodiment, also described with reference to FIG. 8, the communications network unit 100 is a passive optical network unit, ONU. The downstream receiver 110 is arranged to receive a downstream optical signal 112. The upstream transmitter 106 is arranged to receive a portion of downstream optical signal and is arranged to remodulate the said portion to form an upstream optical signal having an RZ modulation format.

The downstream receiver 110 is arranged to receive a first portion of a downstream optical signal 122. The upstream transmitter 106 is arranged to receive a second portion of the downstream optical signal 122 and to both remodulate and amplify it to generate an RZ modulated upstream optical signal carrying the upstream transmission structure.

The ONU 100 further comprises an optical circulator 114 arranged to receive a downstream optical signal 122 and to split it into two substantially equal power signals (a signal to be received by the downstream receiver 110 and an optical seed signal for the upstream transmitter 106), and couples the signals to the downstream receiver 110 and the upstream transmitter 106 respectively.

The upstream transmitter 106 of this example comprises an electro-optic modulator in the form of a reflective semiconductor optical amplifier (R-SOA), an RZ electronic data signal source and signal synchronisation apparatus in the form of a variable optical delay line (ODL). The R-SOA in this example comprises a commercially available device providing 21 dB of small signal gain at 50 mA bias current, 2 dBm output saturation power, 1 dB polarization dependent gain and 8 db noise figure, and is biased at 70 mA. The R-SOA is operated outside of its saturation regime. The seed signal received at the R-SOA has a power level of not greater than P=G−P(max), where P is in dBm, G is the gain of the R-SOA in dB, and P(max) is the maximum optical output power of the R-SOA in dBm. In this example, the optical seed signal has a power of between −15 dBm and −35 dBm. The RZ data signal source generates a 7V peak-to-peak 1.25 Gb/s RZ data signal.

The optical delay line acts to synchronize the upstream traffic bits (i.e. the RZ data signal) with the downstream traffic bits so that the upstream signal is interleaved by one-half bit with respect to the incoming downstream signal. This means that the RZ data signal is applied (i.e. the R-SOA remodulates and amplifies) only when the optical seed signal comprises a CW signal, as follows.

When the downstream optical signal comprises a dark pulse (a logical 1), the optical seed signal comprises the dark pulse tail, which is suppressed by the R-SOA to form a logical 0 for the upstream data signal or is amplified by the R-SOA to form a logical 1. When the downstream data signal comprises a light pulse (a logical 0), the seed signal comprises a CW light pulse having a duration equal to the full clock cycle, one-half of the light pulse is suppressed by the R-SOA to form a logical 1 or the whole pulse is suppressed by the R-SOA to form a logical 0.

Figure 9:
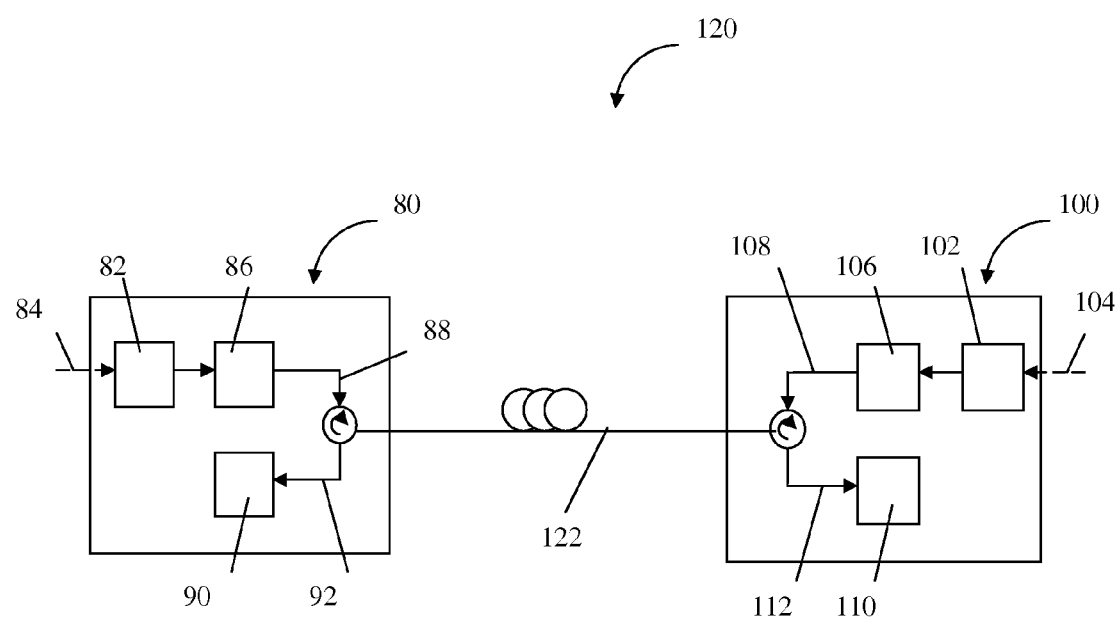
FIG. 9 is a schematic representation of a communications network according to an eleventh embodiment of the invention.

An eleventh embodiment of the invention is illustrated in FIG. 9, which provides a communications network 120 comprising a communications network line terminal 80, as shown in FIG. 7 and described above in either the seventh or eighth embodiment, a communications network unit 100, as shown in FIG. 8 and described above in either the ninth or tenth embodiment, and a communications link 122.

The invention claimed is:

1. A method in a communications network for line coding, the method comprising:
   receiving a plurality of downstream communications traffic bits;
   mapping the downstream communications traffic bits into a plurality of downstream bit positions of a transmission structure and providing a pre-selected bit in each of a plurality of upstream bit positions of the transmission structure to form a downstream transmission structure, wherein the plurality of upstream bit positions is in positions different from the plurality of downstream bit positions of the downstream transmission structure, and wherein each downstream communications traffic bit has a first bit period, and each downstream bit position and each upstream bit position has a second bit period which is less than the first bit period, the total of the second bit periods of the downstream bit positions and the upstream bit positions being equal to the total of the first bit periods of the communications traffic bits;
   generating and transmitting a downstream optical signal carrying the downstream transmission structure;
   receiving a plurality of upstream communications traffic bits;
   mapping the upstream communications traffic bits into the upstream bit positions of the transmission structure to form an upstream transmission structure; and
   generating and transmitting an upstream optical signal carrying the upstream transmission structure.

2. The method as claimed in claim 1, wherein the upstream bit positions are provided consecutively within the transmission structure.

3. The method as claimed in claim 2, wherein the upstream bit positions are provided after the downstream bit positions within the transmission structure.

4. The method as claimed in claim 1, wherein each pre-selected bit is a logical "1".

5. The method as claimed in claim 1, wherein there are a greater number of downstream bit positions in the transmission structure than upstream bit positions.

6. The method as claimed in claim 1, wherein the communications network comprises a passive optical network and the downstream optical signal and the upstream optical signal are generated and transmitted at the same wavelength, and wherein the upstream optical signal is generated by receiving a portion of the downstream optical signal and remodulating the portion of the downstream optical signal to form the upstream optical signal.

7. The method as claimed in claim 6, wherein the downstream optical signal has an inverse-return-to-zero modulation format and the upstream optical signal has a return-to-zero modulation format.

8. A non-transitory, computer-readable medium containing executable computer program instructions that, if executed by a processor, will cause the processor to perform operations comprising:
receiving a plurality of downstream communications traffic bits in a communications network;
mapping the downstream communications traffic bits into a plurality of downstream bit positions of a transmission structure and providing a pre-selected bit in each of a plurality of upstream bit positions of the transmission structure to form a downstream transmission structure, wherein the plurality of upstream bit positions is in positions different from the plurality of downstream bit positions of the downstream transmission structure, and wherein each downstream communications traffic bit has a first bit period, and each downstream bit position and each upstream bit position has a second bit period which is less than the first bit period, the total of the second bit periods of the downstream bit positions and the upstream bit positions being equal to the total of the first bit periods of the communications traffic bits;
generating and transmitting a downstream optical signal carrying the downstream transmission structure;
receiving a plurality of upstream communications traffic bits;
mapping the upstream communications traffic bits into the upstream bit positions of said transmission structure to form an upstream transmission structure; and
generating and transmitting an upstream optical signal carrying the upstream transmission structure.

9. The non-transitory, computer-readable medium as claimed in claim 8, wherein the upstream bit positions are provided consecutively within the transmission structure.

10. The non-transitory, computer-readable medium as claimed in claim 9, wherein the upstream bit positions are provided after the downstream bit positions within the transmission structure.

11. The non-transitory, computer-readable medium as claimed in claim 8, wherein each pre-selected bit is a logical "1".

12. The non-transitory, computer-readable medium as claimed in claim 8, wherein there are a greater number of downstream bit positions in the transmission structure than upstream bit positions.

13. The non-transitory, computer-readable medium as claimed in claim 8, wherein the communications network comprises a passive optical network and the downstream optical signal and the upstream optical signal are generated and transmitted at the same wavelength, and wherein the upstream optical signal is generated by receiving a portion of the downstream optical signal and remodulating the portion of the downstream optical signal to form the upstream optical signal.

14. The non-transitory, computer-readable medium as claimed in claim 13, wherein the downstream optical signal has an inverse-return-to-zero modulation format and the upstream optical signal has a return-to-zero modulation format.

15. A communications network line terminal comprising:
a mapping apparatus arranged to:
receive a plurality of downstream communications traffic bits; and
map the downstream communications traffic bits into a plurality of downstream bit positions of a transmission structure and provide a pre-selected bit in each of a plurality of upstream bit positions of the transmission structure to form a downstream transmission structure, wherein the plurality of upstream bit positions is in positions different from the plurality of downstream bit positions of in the downstream transmission structure, and wherein each downstream communications traffic bit has a first bit period, and each downstream bit position and each upstream bit position has a second bit period which is less than the first bit period, the total of the second bit periods of the downstream bit positions and the upstream bit positions being equal to the total of the first bit periods of the communications traffic bits;
a downstream transmitter arranged to generate and transmit a downstream communications signal carrying the downstream transmission structure; and
an upstream receiver arranged to receive an upstream communications signal.

16. The communications network line terminal as claimed in claim 15, wherein the communications network line terminal is a passive optical network line terminal and the downstream transmitter is arranged to generate and transmit a downstream optical signal carrying the downstream transmission structure, the downstream optical signal having an inverse-return-to-zero modulation format.

17. A communications network unit comprising:
a mapping apparatus arranged to:
receive a plurality of upstream communications traffic bits;
map the upstream communications traffic bits into a plurality of upstream bit positions of a transmission structure to form an upstream transmission structure, the transmission structure additionally having a plurality of downstream bit positions, wherein the plurality of upstream bit positions is in positions different from the plurality of downstream bit positions of the downstream transmission structure, and wherein each downstream communications traffic bit has a first bit period, and each downstream bit position and each upstream bit position has a second bit period which is less than the first bit period, the total of the second bit periods of the downstream bit positions and the upstream bit positions being equal to the total of the first bit periods of the communications traffic bits;

an upstream transmitter arranged to generate and transmit an upstream communications signal carrying the upstream transmission structure; and
a downstream receiver arranged to receive a downstream communications signal.

18. The communications network unit as claimed in claim 17, wherein the communications network unit is a passive optical network unit and wherein the downstream receiver is arranged to receive a downstream optical signal and the upstream transmitter is arranged to receive a portion of the downstream optical signal and is arranged to remodulate the portion of the downstream optical signal to form an upstream optical signal having a return-to-zero modulation format.

19. A communications network comprising:
a communications network line terminal comprising:
a first mapping apparatus arranged to:
receive a plurality of downstream communications traffic bits;
map the downstream communications traffic bits into a plurality of downstream bit positions of a transmission structure and provide a pre-selected bit in each of a plurality of upstream bit positions of the transmission structure to form a downstream transmission structure, wherein the plurality of upstream bit positions is in positions different from the plurality of downstream bit positions of the downstream transmission structure, and wherein each downstream communications traffic bit has a first bit period, and each downstream bit position and each upstream bit position has a second bit period which is less than the first bit period, the total of the second bit periods of the downstream bit positions and the upstream bit positions being equal to the total of the first bit periods of the communications traffic bits;
a downstream transmitter arranged to generate and transmit a downstream communications signal carrying the downstream transmission structure; and
an upstream receiver arranged to receive an upstream communications signal;
a communications network unit comprising:
a second mapping apparatus arranged to:
receive a plurality of upstream communications traffic bits;
map the upstream communications traffic bits into the upstream bit positions of the transmission structure to form an upstream transmission structure;
an upstream transmitter arranged to generate and transmit an upstream communications signal carrying the upstream transmission structure; and
a downstream receiver arranged to receive a downstream communications signal; and
a communications link coupled between the communications network line terminal and the communications network unit and configured to transmit downstream and upstream data signals therebetween.

20. The communications network as claimed in claim 19, wherein the communications network line terminal is a passive optical network line terminal and the downstream transmitter is arranged to generate and transmit a downstream optical signal carrying the downstream transmission structure, the downstream optical signal having an inverse-return-to-zero modulation format, and wherein the communications network unit is a passive optical network unit and wherein the downstream receiver is arranged to receive a downstream optical signal and the upstream transmitter is arranged to receive a portion of the downstream optical signal and the upstream transmitter is further arranged to remodulate the portion of the downstream optical signal to form an upstream optical signal, the upstream optical signal having a return-to-zero modulation format.

\* \* \* \* \*